United States Patent [19]
Bergles

[11] Patent Number: 4,947,703
[45] Date of Patent: Aug. 14, 1990

[54] OPERATING MECHANISM FOR A MULTISPEED BICYCLE HUB

[75] Inventor: Eduard Bergles, Graz, Austria

[73] Assignee: Fichtel & Sachs AG, Schweinfurt, Fed. Rep. of Germany

[21] Appl. No.: 375,900

[22] Filed: Jul. 6, 1989

[30] Foreign Application Priority Data

Jul. 9, 1988 [DE] Fed. Rep. of Germany ....... 3823385

[51] Int. Cl.[5] .............................................. F16C 1/10
[52] U.S. Cl. .............................. 74/501.5 R; 74/502.2; 474/82
[58] Field of Search ............... 74/500, 501.5 R, 501.6, 74/502.2, 502.4, 502.6, 489, 488; 474/82, 83

[56] References Cited

U.S. PATENT DOCUMENTS

| | | | |
|---|---|---|---|
| 863,422 | 8/1907 | Newton | 74/502.2 X |
| 4,193,309 | 3/1980 | Nagano | 74/489 X |
| 4,241,617 | 12/1980 | Nagano et al. | 74/502.2 X |
| 4,279,605 | 7/1981 | Egami | 474/82 |
| 4,305,712 | 12/1981 | Nagano | 474/82 |
| 4,306,871 | 12/1981 | Nagano | 74/501.5 R |

FOREIGN PATENT DOCUMENTS

| | | | |
|---|---|---|---|
| 3440066 | 5/1986 | Fed. Rep. of Germany | 74/501.5 R |
| 43692 | 7/1934 | France | 74/502.2 |
| 979463 | 4/1951 | France | 74/502.2 |
| 0127129 | 7/1984 | Japan | 74/502.2 |

*Primary Examiner*—Vinh T. Luong
*Attorney, Agent, or Firm*—Brumbaugh, Graves, Donohue & Raymond

[57] ABSTRACT

A multispeed bicycle hub is controlled by two speed change rods extending within a bore of the hub shaft towards one end of this bore. An operating mechanism is fixed on the respective end of the hub shaft. This operating mechanism comprises two cam discs acting onto the speed change rods. The cam discs are rotated by a transmission cable from a speed change switch. The cam discs are rotatable about a common cam disc axis by the transmission cable. The cam discs are provided with respective cam tracks which are located adjacent each other in the axial direction of the cam pivot axis. The circumferential extension of the cam tracks is substantially coextensive about the cam pivot axis. The cam tracks act upon respective intermediate levers which intermediate levers are in engagement with the speed change rods.

18 Claims, 2 Drawing Sheets

OPERATING MECHANISM FOR A MULTISPEED BICYCLE HUB

BACKGROUND OF THE INVENTION

In multispeed bicycle hubs having a greater number of speed positions, e.g. 4, 5 or 6 speed positions, it i necessary to control the speed change by at least two speed change rods extending within a bore of the hub shaft. On the other hand, it is desirable to control these speed change rods from one common speed change switch by preferably one single transmission cable. An operating mechanism is therefore provided at one end of the hub shaft which operating mechanism is adapted to shift the speed change rods in response to the actuating movement of the speed change switch, such that the movement of the speed change rods is different in accordance with the desired function of the gear means within the hub sleeve.

STATEMENT OF THE PRIOR ART

From German Publication 3 440 066 a speed change mechanism for a bicycle hub is known. In this speed change mechanism a cam disc is rotatable within a support frame about a cam pivot axis. This cam disc has two different cam tracks which are located in a common plane and are circumferentially off-set with respect to each other about the cam pivot axis. The cam tracks act onto respective intermediate levers which are in engagement with respective speed change rods extending within a bore of a hub shaft. With this known embodiment, the cam disc has a very complicated form, as the respective cam tracks must be adapted to different courses of axial movement of the speed change rods.

OBJECT OF THE INVENTION

It is an object of the present invention to provide an operating mechanism for a multispeed bicycle hub in which less complicated cam means can be used. A further object of the invention is to provide an operating mechanism in which the space required by the cam means when being rotated about the cam pivot axis is smaller.

SUMMARY OF THE INVENTION

An operating mechanism is provided for a multispeed bicycle hub. The multispeed bicycle hub has a hub shaft with a hub shaft axis and two ends. A hub sleeve is rotatably mounted on the hub shaft about said hub shaft axis. Gear means are accommodated within the hub sleeve. At least one driving wheel is in driving connection with an input member of the gear means. At least one output member of the gear means is in driving connection with the hub sleeve. The hub shaft has an axially extending hub shaft bore open towards at least one of the ends. The hub shaft bore accommodates two speed change members extending along the hub shaft bore and being in control connection with the gear means A first one of the speed change members is tubular and a second one of the speed change members extends coaxially within the first speed member. Both speed change members have a respective end portion adjacent one end of the hub shaft.

The operating mechanism has a support frame adapted to be fixed with respect to said one end of the hub shaft. Cam means are pivotally mounted on the support frame about a cam pivot axis These cam means are adapted for operative connection with an actuating switch by transmission means. The cam means are further adapted for acting upon the end portions of both said speed change members, such as to shift said speed change members in response to pivotal movement of the cam means about said cam pivot axis. The cam means comprise two cam tracks adjacent one another along the cam pivot axis and are connected for common rotation about the cam pivot axis. A first one of said cam tracks is adapted for acting upon the first speed change member and a second one of the cam tracks is adapted for acting onto the second speed change member.

It is evident that by the location of the two cam tracks in axially off-set relationship, it is possible to manufacture the respective cam tracks in a more independent manner than it was possible in the prior art devices in which the tracks were provided circumferentially adjacent each other along one edge of one cam disc. It is further evident that when manufacturing the two cam tracks, one must in each case only consider the desired course of movement of the respective speed change member. Therefore, it is also possible to combine one specific cam track for one of the speed change members with various forms of cam tracks for the other speed change member and vice versa.

In accordance with a preferred embodiment of the invention, the cam tracks are substantially coextensive in circumferential direction about the cam pivot axis. In case of this preferred embodiment, the space requirements for the cam means are considerably reduced as compared with an embodiment of the prior art in which both cam tracks are provided circumferentially adjacent each other on one edge of the cam disc. In other words: the maximum diameter of the cam disc can be reduced.

According to a further development of the invention, the first and the second cam tracks are formed on the respective circumferential edges of the respective first and second cam discs. This allows the separate manufacturing of the first and second cam discs and the combination of one first cam disc with various second cam discs and vice versa. The cam discs are commonly pivotally mounted about the cam pivot axis.

The first and the second cam disc can be connected for common pivotal movement by a substantially axially extending connection member.

It is desirable that the first cam track and the second cam track act upon the first and said second speed change members, respectively, through respective first and second intermediate levers. These intermediate levers may be pivotally mounted about a common lever pivot axis, which is substantially parallel to the cam pivot axis. Preferably, both the cam pivot axis and the lever pivot axis are substantially transverse to the hub shaft axis.

The first and the second intermediate lever may be provided with a first and a second cam track follower, respectively. In such case, the first and the second cam track followers are in engagement with the first and the second cam track, respectively.

In order to provide a most direct engagement of the intermediate levers with the respective speed change members, it is proposed that the second intermediate lever is located substantially in a plane containing said hub shaft axis and having an engagement edge acting upon an end face of the second speed change member and that said first intermediate lever is off-set with respect to the hub shaft axis and has a fork portion acting upon an end face of the tubular first speed change member.

If the first and the second cam tracks are provided on respective circumferential edges of first and second cam discs as stated above and if these cam discs are pivotally mounted about said cam pivot axis, a most compact arrangement is obtained, if said first and second intermediate levers are located adjacent each other between respective cam discs.

The support frame may be formed as a housing. It is desirable to provide a housing which completely covers all the functional parts of the operating mechanism and more particularly, the cam discs and the intermediate levers in all pivotal positions thereof. It is evident that in accordance with the invention in which the cam tracks are axially adjacent and circumferentially coextensive, the housing may be relatively small and, nevertheless, completely cover the cam discs in a possible pivotal positions thereof.

The housing may comprise a substantially U-shaped housing member which is preferably made of one piece of sheet metal. This U-shaped housing has substantially parallel limbs. The cam pivot axis extends substantially transverse through said limbs. The first and second cam discs are provided between the limbs.

For attaching the transmission means, one of said cam discs may be provided with a transmission means attachment member. This transmission means attachment member may be bent, preferably in U-shape, such as to pass through a recess of one of said limbs. Such, the transmission means may be attached to the transmission means attachment member outside the housing.

In case of using a Bowden cable having a core and a tube member, the core member may be attached to the transmission means attachment member and the tube member may be supported by a tube support member fixed to the housing.

In case of using intermediate levers as stated above, the tube support member may be formed by the end portion of a lever pivot pin on which the intermediate levers are pivotally mounted.

The support frame may be provided with a socket adapted for adjustable mounting on said one end of said hub shaft.

While it is possible to use a pull cable only for movement of the cam discs in one pivotal direction and use spring means for movement of the cam discs in the other pivotal direction, it is preferred to use push-pull transmission means which are adapted to transmit pivotal movement to the cam discs in both pivotal directions.

The first and the second speed change member may be biased towards cooperation with the first and second cam tracks by internal respective first and second biasing means. These first and second biasing means may be located within the hub sleeve. The first and second biasing means push the first and second speed change member in axial direction of the hub shaft axis outwards of one of said ends.

In order to reduce the force necessary for rotating the cam discs, the first and second cam tracks may be provided with such respective profiles that within at least part of the circumferential extent of the cam tracks, respective torques created by said first and second biasing means upon respective cam tracks compensate each other at least partially. This is Particularly possible in cases of e.g. a 6-speed gear in which a 2-speed gear unit and a 3-speed gear unit are in serial arrangement within the hub sleeve.

The various features of the invention are discussed especially in the accompanying claims which form a part of the disclosure.

For the better understanding of the invention, its working advantages and specific effects reference is now made to the accompanying drawings and the description, in which preferred forms of embodiment of the invention are discussed.

BRIEF DESCRIPTION OF THE DRAWINGS

The invention will be explained in greater detail below by reference to the forms of embodiment as represented in the drawing, wherein.

DESCRIPTION OF THE PREFERRED EMBODIMENT

Figure 4:
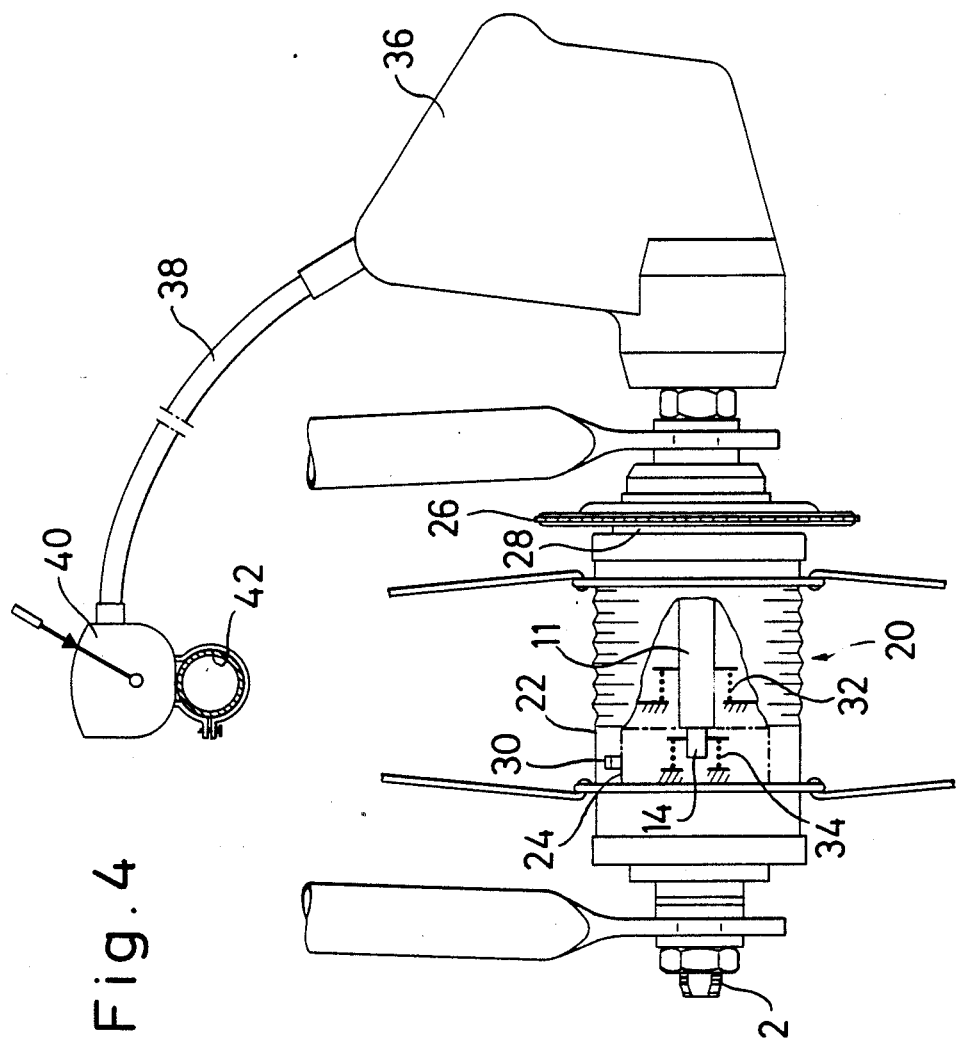
FIG. 4 shows in diagrammatic way the arrangement of the operating mechanism on a bicycle hub in connection with a gear change switch.

In FIG. 4 a multispeed bicycle hub is designated by 20. This bicycle hub comprises a hub shaft 2 and a hub sleeve 22 rotatably mounted on the hub shaft 2. A multispeed gear unit 24 is housed within the hub sleeve 22. This multispeed gear unit 24 is in driving connection with a driving wheel 26 in the form of a chain sprocket. The driving wheel 26 is connected with an input member 28 of the multispeed gear unit 24. An output member 30 of the multi speed gear unit 24 is in driving engagement with the hub sleeve 22. A first tubular speed change member 11 is guided within the hub shaft 2, and a second pin-shaped speed change member 14 is guided within the first speed change member 11. The first speed change member 11 is biased by a first compressional spring 32 towards the right hand open end of the hub shaft 2 and the second speed change member 14 is biased by a second compressional spring 34 towards the right hand end of the hub shaft 2. Both speed change members 11 and 14 are in control connection with the multispeed gear change unit 24 at their left hand ends and are controlled by an operating mechanism 36 fastened to the right hand end of the hub shaft 2. The operating mechanism 36 is controlled by transmission means 38, namely a push-pull cable which is connected with a gear switch 40 mounted on a handle bar 42 of the respective bicycle.

Figure 3:
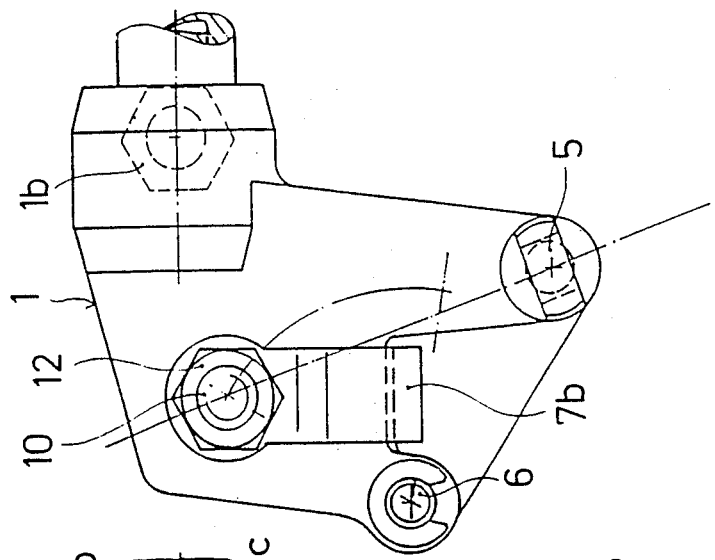
FIG. 3 shows a plane view along line III of FIG. 2.
Figure 2:
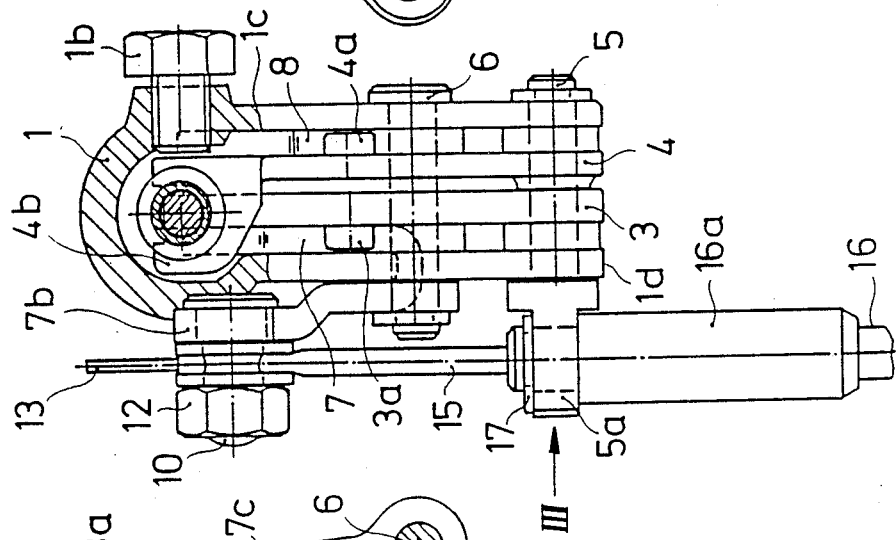
FIG. 2 shows a section perpendicular to the hub shaft axis.
Figure 1:
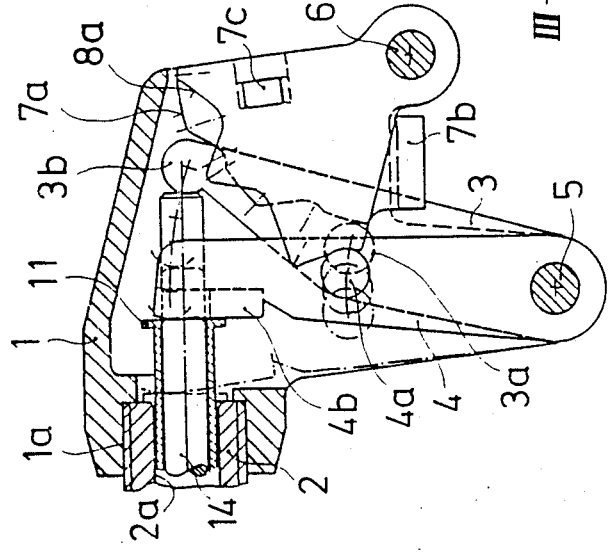
FIG. 1 shows an operating mechanism on the end of a hub shaft in a section along the hub shaft axis and transverse to the cam pivot axis and to the lever pivot axis.

Details of the operating mechanism are shown in FIGS. 1 to 3.

In FIGS. 1, 2 and 3, 1 designates the U-shaped housing a an operating mechanism which is arranged adjustably, by means of a reception bore 1a, on the end of the hub shaft 2 of a multispeed hub having more than three gear ratios. For securing the housing 1 of the operating mechanism on the hub shaft 2 there serves a screw 1b, as disclosed by FIGS. 2 and 3.

The housing 1 of the operating mechanism is made somewhat U-shaped with two limbs 1c and 1d and receives, in bores of its limbs 1c and 1d a lever bearing bolt 5 for a pivotally movable intermediate lever 3 and for an intermediate lever 4 movable independently. A cam bearing bolt 6, parallel to the lever bearing bolt 5, serves for the pivotally movable mounting of cam discs 7 and 8 which are connected for common pivotal movement by means of a bent-out tab 7c on the cam disc 7, as shown by FIG. 1.

The control discs 7 and 8 each comprise a cam track 7a and 8a, as disclosed by FIG. 1, which are in engagement with a cam follower 3a on the intermediate lever 3 and a cam follower 4a on the intermediate lever 4. These cam followers 3a and 4a are pressed out of the respective intermediate lever 3 and 4. It is also possible to use special rollers as cam followers.

The intermediate levers 3 and 4 act, as shown by FIG. 1, with their ends upon the speed change members 14 and 11, respectively, which are guided concentrically in the hub shaft 2. The speed change members 14 and 11 are subject to stress from the compressional springs 34 and 32, as shown in FIG. 4.

The speed change member 14 acts onto an end portion 3b of the intermediate lever 3 and the speed change member 11 acts onto a fork shaped end portion 4b of the intermediate lever 4.

The actuation of the operating mechanism is effected by means of the push-pull cable 38. The core 13 of the push-pull cable is connected to an attachment member 7b by means of a clamping device 10,12. The attachment member 7b is integral with the intermediate lever 7 and extends through a recess of the limb 1d. The attachment member 7b is bent in U-shape with respect to the cam disc 7. A stiffening member 15 is provided on the core 13 for stiffening the core 13 in view of its push-pull function. In accordance with the cam tracks 7a and 8a, the speed change members 14 and 11 are either pushed inwards of the bore 2a of the hub shaft 2 or moved outwards under the action of the compressional springs 34 and 32, respectively.

The core 13 is guided in a flexible tube 16 the end part 16a of which is supported on a tube support member 5a connected with the lever bearing bolt 5 and held by means of a securing washer 17.

The above-described elements of the upper-rating mechanism have the following manner of operation:

When the attachment member 7b is rotated by means of the push-pull cable 38, the cam disc 7 connected therewith pivots through a corresponding arc. The cam follower 3a, resting on the cam disc 7, comes into engagement with various points of the cam track 7a. Simultaneously with the pivoting of the cam disc 7, as a result of the operative connection by means of the engaging tab 7c the cam disc 8 is also correspondingly entrained, so that the cam follower 4a of the intermediate lever 4 also comes in engagement with various regions of the cam track 8a. The intermediate levers 3 and 4 are pivoted by the cam followers 3a and 4a, respectively.

In FIG. 1 there is shown a position in which both the speed change members 14 and 11 are in outermost right hand position. The innermost left hand positions are indicated by dotted lines.

One can see from the courses of the cam tracks 7a and 8a that inward movement of the speed change member 14 is accompanied by outward movement of the speed change member 11 and vice versa. The course of the cam tracks 7a and 8a may be also such that the position of one of the speed change members 14,11 is not altered, when the other one of the speed change members 14,11 is moved inwards. In practice, the form of the cam tracks 7a and 8a must be selected in accordance with the control requirements of the multispeed gear unit 24. It is desirable, however, to attune the courses of the cam tracks 7a and 8a such that simultaneous shift inward movements of the speed change members 14 and 11 are avoided in order to reduce the shift force requirements at the speed change switch 40. This is particularly possible in the case of a 6-speed hub in which a 3-speed gear unit and a 2-speed gear unit are connected in series and one of the speed change members acts onto the 3-speed gear unit and the other one of the speed change members acts onto the 2-speed gear unit.

Adjustment of the operating mechanism is not necessary. For assembly, this operating mechanism is fitted onto the hub shaft 2 until abutment, and clamped by the screw 1b.

Specific forms of embodiment of the invention have been represented and described in order to illustrate the use of the principles of the invention. Of course the invention can also be realised in other ways without departing from these principles.

The reference levers in the claim serve only for facilitation of understanding and are not to be understood as a limitation.

What is claimed is:

1. An operating mechanism to be used in combination with a multi-speed bicycle hub, said multi-speed bicycle hub having a hub shaft (2) with a hub shaft axis and two ends, a hub sleeve (22) being rotatably mounted on said hub shaft (2) about said hub shaft axis, gear means (24) being accommodated within said hub sleeve (22), at least one driving wheel (26) being in driving connection with an input member (2) of said gear means (24), at least one output member (30) of said gear means (24) being in driving connection with said hub sleeve (22), said hub shaft (2) having an axially extending hub shaft bore (2a) open towards at least one of said ends, said hub shaft bore (2a) accommodating two speed change members (11,14) extending along said hub shaft bore (2a) and being in control connection with said gear means (24), a first one (11) of said speed change members (11,14) being tubular and a second one (14) of said speed change members (11,14) extending coaxially within said first speed change member (11), both said speed change members (11,14) having a respective end portion adjacent said one end of said hub shaft (2), said operating mechanism having a support frame (1) adapted to be fixed with respect to said one end of said hub shaft (2), cam means (8,7) being pivotally mounted on said support frame (1) about a cam pivot axis (6), said cam means (8,7) being adapted for operative connection with an actuating switch (40) by transmission means (38), said cam means (8,7) being further adapted for acting upon said end portions of both said speed change members (11,14), such as to shift said speed change members (11,14) in response to pivotal movement of said cam means (8,7) about said cam pivot axis (6), said cam means (8,7) comprising two cam tracks (8a,7a) adjacent one another in the axial direction of said cam pivot axis (6) and being connected for common rotation about said cam pivot axis (6), a first one (8a) of said cam tracks (8a,7a) being adapted for acting upon said first speed change member (11) and a second one (7a) of said cam tracks (8a,7a) being adapted for acting onto said second speed change member (14).

2. An operating mechanism as set forth in claim 1, said cam tracks (8a,7a) being substantially coextensive in circumferential direction about said cam pivot axis (6).

3. An operating mechanism as set forth in claim 1, said first (8a) and said second cam track (7a) being formed on respective circumferential edges of respective first (8) and second (7) cam discs (8,7), said cam discs (8,7) being commonly pivotally mounted about said cam pivot axis (6).

4. An operating mechanism as set forth in claim 3, said first (8) and said second cam disc (7) being connected for common pivotal movement by a substantially axially extending connection member (7c).

5. An operating mechanism as set forth in claim 1, said first cam track (8a) and said second cam track (7a) acting upon said first (11) and said second (14) speed change members, respectively, through respective first and second intermediate levers (4,3) said intermediate levers (4,3) being pivotally mounted about a common lever pivot axis (5), said lever pivot axis (5) being substantially parallel to said cam pivot axis (6), both said cam pivot axis (6) and said lever pivot axis (5) being substantially transverse to said hub shaft axis.

6. An operating mechanism as set forth in claim 5, said first (4) and said second (3) intermediate lever carrying a first (4a) and a second (3a) cam track follower, respectively, said first (4a) and said second (3a) cam track followers being in engagement with said first (8a) and said second (7a) cam track, respectively.

7. An operating mechanism as set forth in claim 5, said first (4) and said second (3) intermediate-levers having respective free ends remote from said lever pivot axis (5) and adjacent each other, said free ends acting onto said first (11) and said second (14) speed change members, respectively.

8. An operating mechanism as set forth in claim 5, said second intermediate lever (3) being located substantially in a plane containing said hub shaft axis and having an engagement edge (3b) acting upon an end face of said second speed change member (14), said first intermediate lever (4) being off-set with respect to said hub shaft axis and having a fork portion (4b) acting upon an end face of said first speed change member (11).

9. An operating mechanism as set forth in claim 5, said first (8a) and said second (7a) cam tracks being provided on respective circumferential edges of first and second cam discs (8,7), said cam discs (8,7) being pivotally mounted about said cam pivot axis (6), said first and second intermediate levers (4,3) being located adjacent each other between respective cam discs (8,7).

10. An operating mechanism as set forth in claim 1, said support frame (1) being a housing (1).

11. An operating mechanism as set forth in claim 10, said housing (1) comprising a substantially U-shaped housing member (1), said U-shaped housing member (1) having substantially parallel limbs (1c,1d), said cam pivot axis (6) extending substantially transverse through said limbs (1c,1d), said first and second cam tracks (8a,7a) being provided on respective circumferential edges of respective first and second cam discs (8,7), said cam discs (8,7) being provided between said housing limbs (1c,1d).

12. An operating mechanism as set forth in claim 11, one (7) of said cam discs (8,7) being provided with a transmission means attachment member (7b), said transmission means attachment member (7b) being bent such as to pass through a recess of one (1d) of said limbs (1c,1d), said transmission means (38) being attachable to said transmission means attachment member (7b) outside said housing (1).

13. An operating mechanism as set forth in claim 12, said transmission means (3() being Bowden wire means (16,13) having a core member (13) and a tube member (16), said core member (13) being attachable to said transmission means attachment member (7b), said tube member (16) being supported by a tube support member (5a) fixed to said housing (1).

14. An operating mechanism as set forth in claim 13, said first (8) and said second (7) cam discs acting upon said first (11) and said second (14) speed change member through first (4) and second (3) intermediate levers, respectively, said intermediate levers (4,3) being pivotally mounted about a common lever pivot pin (5) extending substantially perpendicularly to said housing limbs (1c,1d), said tube support member (5a) being formed by an end portion (5a) of said lever pivot pin (5).

15. An operating mechanism as set forth in claim 1, said support frame (1) being provided with a socket (1a) adapted for adjustable mounting on said one end of said hub shaft (2).

16. An operating mechanism as set forth in claim 1, said transmission means (38) being push-pull transmission means.

17. An operating mechanism as set forth in claim 1, said first (11) and said second (14) speed change members being biased towards cooperation with said first (8a) and second (7a) cam tracks by internal respective first (32) and second (34) biasing means within said hub sleeve (22), said internal first (32) and second (34) biasing means pushing said first (11) and said second (14) speed change members (11,14) in axial direction of said hub shaft axis outwards of said one end.

18. An operating mechanism as set forth in claim 17, said first (8a) and second (7a) cam tracks having such respective profiles that within at least part of the circumferential extent of said cam tracks (8a,7a), respective torques created by said first (32) and second (34) biasing means upon respective cam tracks (8a,7a) avoid addition or compensate each other at least partially.

* * * * *

UNITED STATES PATENT AND TRADEMARK OFFICE
CERTIFICATE OF CORRECTION

PATENT NO. : 4,947,703

DATED : August 14, 1990

INVENTOR(S) : Eduard Bergles

It is certified that error appears in the above-identified patent and that said Letters Patent is hereby corrected as shown below:

On the title page, in item [56] References Cited, under FOREIGN PATENT DOCUMENTS, line 3, delete "R";
Col. 1, line 7, "it i" should read --it is--;
Col. 3, line 19, "in a" should read --in all--;
Col. 3, line 67, "Particularly" should read --particularly--;
Col. 4, line 59, "a an" should read --of an--;
Col. 4, line 67, "1cand" should read --1c and--;
Col. 6, line 22, "levers" should read --numbers--;
Col. 6, line 34, "(2)" should read --(28)--;
Col. 8, line 17, "(3()" should read --(38)--.

Signed and Sealed this

Seventh Day of January, 1992

Attest:

HARRY F. MANBECK, JR.

*Attesting Officer*     *Commissioner of Patents and Trademarks*